UNITED STATES PATENT OFFICE.

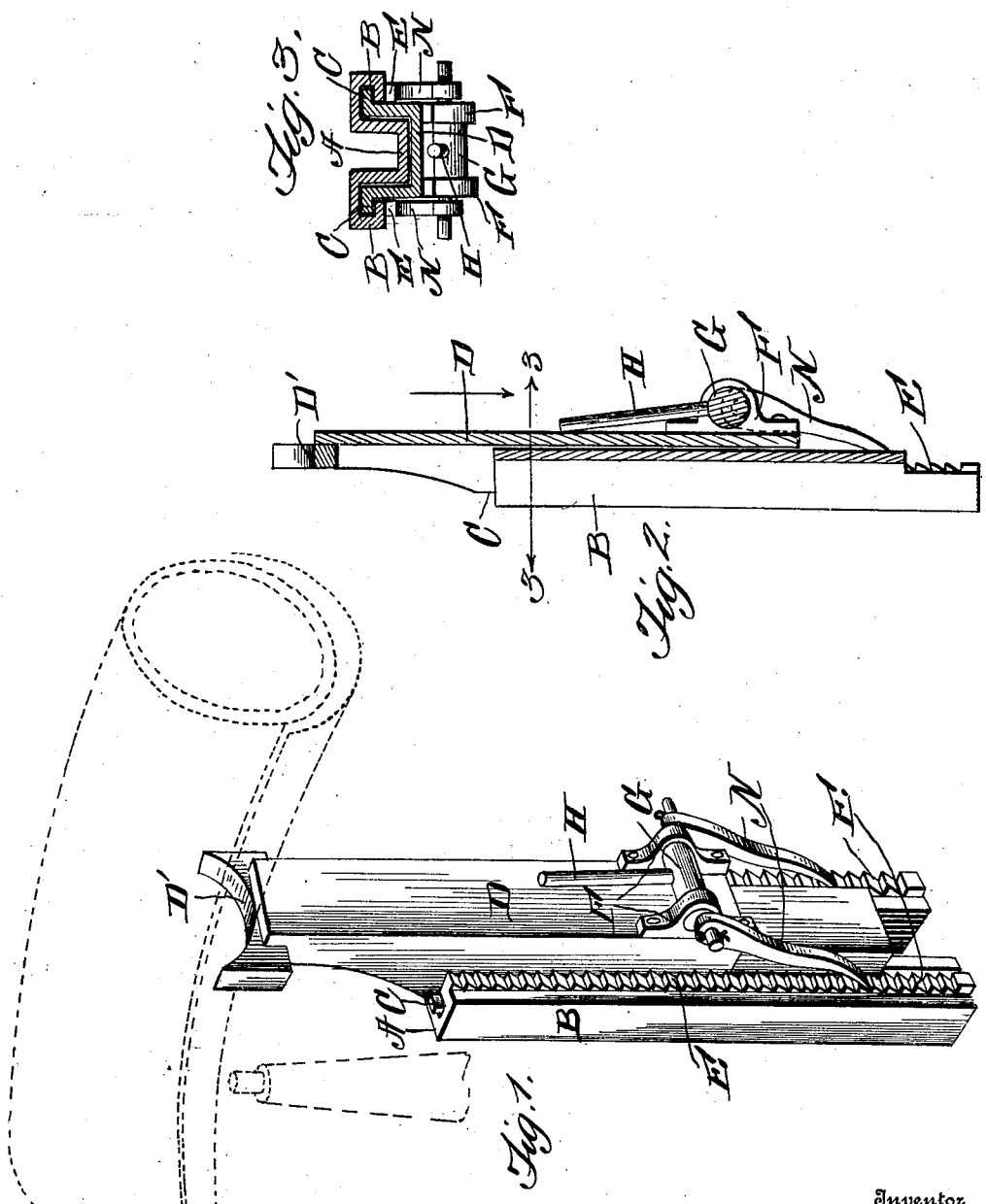

GEORGE R. MACOMBER, OF CHICAGO, ILLINOIS.

TIRE-TIGHTENING APPARATUS.

No. 888,628.　　　Specification of Letters Patent.　　　Patented May 26, 1908.

Application filed February 8, 1908. Serial No. 414,963.

*To all whom it may concern:*

Be it known that I, GEORGE R. MACOMBER, a citizen of the United States, residing at Chicago, in the county of Cook and State of Illinois, have invented certain new and useful Improvements in Tire-Tightening Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for tightening tires upon vehicle wheels, and more specifically comprises means for expanding the felly to allow a washer to be placed upon the shoulder of a spoke.

The invention comprises various details of construction, combinations and arrangements of parts which will be hereinafter fully described and then specifically defined in the appended claims.

My invention is illustrated in the accompanying drawings, in which:—

Figure 1 is a perspective view showing the application of my device to a wheel. Fig. 2 is a sectional view through the cam and bearing therefor, showing the means for imparting a longitudinal movement to the movable part of a lifting jack, and Fig. 3 is a cross sectional view, on the line 3—3 of Fig. 2.

Reference now being had to the details of the drawings by letter, A designates a casing of the tire tightening device which, as noted by the sectional view, is hollow in cross section and provided with flanges B upon the opposite marginal edges thereof, said flanges forming guideways for the reception of the flanges C upon the opposite edges of the movable shell D. It will be noted that said shell D is hollow and adapted to fit over and rest in contact with the outer surface of said casing, and one end of the shell D is concaved as at D' for the reception of the convexed surface of a felly against which it is adapted to be held. Upon each of the longitudinal flanges of said casing is formed a series of ratchet teeth E, and the two parallel walls of the shell D are guided between the opposite walls of the casing and the inner faces of said rack bars.

Mounted upon said shell are the bearing blocks F, in which a cam roller G is journaled, and H designates a handle which is fixed to said cam roller.

N—N are pawls which are loosely journaled upon pintles projecting eccentrically from the ends of said cam roller. Said pawls are adapted to ride upon the ratchet teeth and form fulcrums for causing the shell to be moved forward slightly when it is desired to expand the felly for the purpose of inserting a washer upon the shouldered portion of a spoke. After the washer has been adjusted in place, the cam roller may be given a partial reverse rotary movement in order to relieve the felly of the strain thereon.

From the foregoing, it will be noted that, by the provision of the device shown and described, a simple and efficient expanding means is afforded for use upon vehicle wheels for expanding the felly whereby a washer may be adjusted in place upon the spoke thereof, said washer forming a cushion which will hold the wheel in a true circle.

What I claim is:—

A device for expanding fellies comprising a hollow shell which is angular in cross section and provided with longitudinal, angular flanges, the ends of which are inwardly turned forming guideways, the outer faces of said inwardly turned portions of the flanges having ratchet teeth, the inner edges of which are flush with the inner end of said flanges, a hollow standard angular in cross section and telescoping within the guideways of said shell, a shaft journaled upon said standard, pins mounted eccentrically thereon, dogs pivoted to said pins and adapted to engage said ratchet teeth, as set forth.

In testimony whereof I hereunto affix my signature in the presence of two witnesses.

GEORGE R. MACOMBER.

Witnesses:
　RUDOLPH FRANKENSTIEN,
　JOHN F. HAAS.